United States Patent [19]

Heath

[11] Patent Number: 4,689,053
[45] Date of Patent: Aug. 25, 1987

[54] HEATING SYSTEM WITH GAS JET DRIVEN CIRCULATION FLOW FOR HIGH PRESSURE WELL HEAD SEPARATOR

[76] Inventor: Rodney T. Heath, 4901 E. Main, Farmington, N. Mex. 87401

[21] Appl. No.: 835,516

[22] Filed: Mar. 3, 1986

[51] Int. Cl.⁴ .............................................. B01D 51/00
[52] U.S. Cl. ....................................... 55/20; 55/32; 55/49; 55/51; 55/175; 55/196; 55/208; 203/18; 165/40
[58] Field of Search ................ 55/20, 32, 208, 175, 55/174, 160, 196, 49, 51; 203/18; 417/155, 160; 165/40

[56] References Cited

U.S. PATENT DOCUMENTS

| | | | |
|---|---|---|---|
| 2,428,643 | 10/1947 | Young | 55/32 |
| 2,812,827 | 11/1957 | Worley et al. | 55/32 |
| 3,094,574 | 7/1963 | Glasgow et al. | 261/23 |
| 3,193,990 | 7/1965 | Smith | 55/32 |
| 3,206,916 | 9/1965 | Glasgow | 55/51 |
| 3,288,448 | 11/1966 | Patterson et al. | 261/152 |
| 3,348,601 | 10/1967 | Hill | 55/32 |
| 3,370,636 | 2/1968 | Francis et al. | 55/32 |
| 4,198,214 | 4/1980 | Heath | 55/160 |
| 4,342,572 | 8/1982 | Heath | 55/160 |
| 4,421,062 | 12/1983 | Padilla, Sr. | 122/1 R |
| 4,511,374 | 4/1985 | Heath | 55/20 |
| 4,588,424 | 5/1986 | Heath et al. | 55/208 |

Primary Examiner—Bernard Nozick
Attorney, Agent, or Firm—Klaas & Law

[57] ABSTRACT

A high pressure well head separator system having a circulation heating system with energy to circulate liquid heating medium between a heating unit and the separator provided by well gas injected into the heating medium by a gas jet. Gas injected into the heating medium and control gas used to regulate flow of heating medium to the separator is recaptured and subsequently burned by a gas burner pilot associated with a gas burner used for heating the liquid heating medium in the heating unit.

32 Claims, 3 Drawing Figures

HEATING SYSTEM WITH GAS JET DRIVEN CIRCULATION FLOW FOR HIGH PRESSURE WELL HEAD SEPARATOR

BACKGROUND OF THE INVENTION

This invention relates to a natural gas well effluent high pressure separator system of the type employed at a gas well head to remove connate well fluids from a well effluent composed of a mixture of gas, oil and water and, more particularly, to a self circulating gas jet driven heating system for use with such a natural gas high pressure separator.

Examples of gas separating and dehydrating units are disclosed in U.S. Pat. Nos. 3,094,574; 3,288,448; 4,342,572; 4,421,062 and U.S. patent application Ser. No. 661,398 filed Oct. 16, 1984 for FLUID PUMPING SYSTEM of Charles R. Gerlach and Rodney T. Heath now U.S. Pat. No. 4,588,424; the disclosures of which are specifically incorporated herein by reference. In general, such units comprise a separator means for receiving the gas-oil-water mixture from the well head and separating the oil and water liquids from "wet" (water vapor laden) gas; and a water absorber means, which employs a liquid dehydrating agent such as glycol, for removing the water vapor from the gas subsequent to its passage through the separator and producing "dry" gas suitable for commercial usage.

Such well gas dehydration units may comprise two separate glycol circulation systems, one glycol circulation system sometimes referred to as the glycol heating system circulates glycol through a closed loop between a heating means such as a reboiler and the separator means in order to maintain the temperature in the separator at an optimum value for separating oil and water mixture from the well effluent. Circulation of glycol in such a heating glycol circulation system is sometimes provided by a thermosyphon flow produced by the temperature difference between the separator and the reboiler. Another glycol circulation system, sometimes referred to as the process glycol circulation system, is generally caused to circulate by a glycol pump. The process glycol is continuously supplied to the absorber means in a "dry" low water vapor pressure condition and is removed from the absorber means in a "wet" high water vapor pressure condition. The wet glycol is continuously removed from the absorber means and circulated through a treater means which may include the reboiler means (which is also used to heat the heating glycol) and a still column, etc. for removing the absorbed water from the wet progess glycol to provide a new supply of dry process glycol. The glycol reboiler means usually comprises a gas burner for heating the glycol therein. Since the separating/dehydrating units are continuously operated at well sites without continuous monitoring by operating personnel, reliable continuous operation of the glycol circulation systems is of critical importance. Because of the often remote location of wells, it is highly desirable to use energy sources readily available at the well site for operation of these circulation systems. Since the glycol heating system uses substantial amounts of energy it is of upmost economic importance to operate this system with maximum efficiency and minimum energy loss.

Although the use of a thermosyphon, such as described in Heath, U.S. Pat. No. 4,342,572 to produce circulation in a heating glycol system is extremely energy efficient, a drawback of thermosyphon circulation is that it is relatively slow and thus limits the speed at which heat can be transferred to the separator by the heating glycol system.

Another manner of producing circulation in a heating glycol system is through use of a gas jet pump as described in U.S. Pat. No. 4,421,062 of Padilla Sr. which is hereby incorporated by reference for all that is disclosed therein. In this arrangement, well gas, after passing through a series of drip pots and regulators which reduces the gas pressure to about 25 psi, is injected into a heating glycol flow line which forms part of a closed loop system between a high pressure separator and a reboiler. The gas is injected through a nozzle structure directed toward the reboiler and induces a venturi effect on the glycol in the surrounding portion of the glycol flow line to produce upward flow thereof through a lift pipe portion of the flow line into the reboiler which consequently produces circulation of heating glycol from an opposite end of the reboiler into the separator. A relatively high circulation rate flow of heating glycol may be provided between the separator and the reboiler so long as gas is discharged through the gas nozzle structure. Gas flow to the gas nozzle structure is controlled by a thermostat in the separator which permits a gas flow through the gas nozzle structure whenever the separator temperature falls below a predetermined value and which shuts off the gas flow to terminate the circulation of heating glycol whenever the separator temperature exceeds another predetermined value. Gas discharged from the nozzle structure into the glycol flow is subsequently collected in a scrubber housing above the reboiler tank and is thereafter discharged through a gas outlet line having a relief valve set at approximately 23 psi. The gas outlet line from the scrubber passes through another series of check valves and is connected to the burner and burner pilot. The burner is turned on and off in response to a control signal from a thermostat in the reboiler. Thus, some of the gas discharged through the gas nozzle structure to produce circulation of heating glycol between the separator and reboiler is available for use by the burner and burner pilot. A problem with this system is that a great deal of the gas discharged through the gas jet may of necessity be vented to the atmosphere during periods when the gas jet is operating without the burner firing. Thus, this system may waste considerable amounts of gas. Another problem inherent in such a system is that there is no available means for removing heating glycol from the portion of the circulation line passing through the separator; thus, heat transfer to the separator from the heating glycol system cannot be rapidly terminated when needed for optimum separator temperature control.

It would be generally desirable to provide a heating glycol circulation system for circulating heating glycol between a reboiler and high pressure separator which provides the extremely high energy efficiency of a thermosyphon heating system while providing the relatively high speed circulation capability of a gas injection type circulation system without waste of valuable sale gas.

It would also be desirable to provide a heating glycol system which continuously circulates heating glycol to a separator when heat is required and which is adapted to enable evacuation of heating glycol from the circulation line portion passing through the separator to allow rapid temperature reduction in the separator when required.

SUMMARY OF THE INVENTION

The present invention provides a heating system for a high pressure separator which utilizes circulation of heating glycol between the separator and a heating means such as a reboiler for heating the separator. The heating glycol is heated by a burner and associated fire tube positioned in the heating means and fueled by natural gas from the well. In one embodiment, which is presently the best mode contemplated, natural gas which is ultimately used by a burner pilot is initially injected into the heating glycol circulation loop to produce glycol circulation. The amount of gas injected is dependent on the pilot burner gas requirement thus none of this gas must be vented to the atmosphere. After being jetted into the glycol the gas is recovered in a sealed gas collection area above the glycol in the heating means. Gas from other heating system operating components may also be collected in the gas collection area. All of this collected gas is in fluid communication with and is ultimately burned by the burner pilot. The injection of gas into the heating glycol causes a jetting effect which transfers energy to the heating glycol and provides a circulation rate therein which is significantly greater than that provided by a thermosyphon type circulation system. Thus, the capability of the heating glycol system of the present invention to deliver heat to the separator is considerably better than that of a thermosyphon type system, yet the energy consumption requirements of the system of the present invention are no greater than that of a thermosyphon type system because all gas used to increase the heating glycol flow rate is later burned to heat the heating glycol. Control gas for operating various separator controls including a separator thermostat and a gas pressure operated seal pot used to control the heating glycol flow to the separator may be provided from the same gas supply system used for gas injection into the heating glycol. Gas vented from the seal pot may also be collected in the gas collection area and used to operate the burner pilot.

Thus, a heating glycol system having a relatively high circulation rate is provided which uses energy sources provided at the well site very efficiently.

In a slightly different embodiment of the invention, all of the burner gas as well as the burner pilot gas is initially injected into the heating glycol circulation loop and thus a considerably greater amount of gas passes through the gas jet than in the previously discussed embodiment with a correspondingly greater glycol circulation flow rate.

Thus, the invention may comprise a well effluent separator system for use at a well head for processing well effluent to obtain relatively liquid free gas comprising:

(a) high pressure separator means having an optimum operating temperature range for receiving well effluent and for separating said well effluent into a liquid component and a relatively liquid free gas component;

(b) heat exchange conduit means in said high pressure separator means for receiving a flow of heat exchange liquid therethrough for transferring heat from said heat exchange liquid to the contents of said separator means;

(c) heating means for providing a supply of hot, heat exchange liquid, said heating means having an optimum operating temperature range;

(d) gas operated burner means operatively associated with said heating means for heating said heat exchange liquid therein;

(e) gas operated burner pilot means for igniting said burner means;

(f) circulation conduit means for enabling circulation of said heat exchange liquid between said heating means and said heat exchange conduit means in said separator means;

(g) operating gas supply line means for supplying well gas for heating and for operating various separator control systems;

(h) gas jet means in continuous fluid communication with said operating gas supply line means for continuously injecting gas into said circulation conduit means for producing circulation of said heat exchange liquid in said circulation conduit means;

(i) sealed gas recapture means for recapturing substantially all of said gas injected into said circulation conduit means by said gas jet means, said sealed gas recapture means being in continuous fluid communication with said burner pilot means whereby gas collected by said gas recapture means is subsequently burned by said burner pilot means.

The invention may also comprise a well effluent separator system for use at a well head for processing well effluent to obtain relatively liquid free gas comprising:

(a) high pressure separator means having an optimum operating temperature range for receiving well effluent and for separating said well effluent into a liquid component and a wet gas component;

(b) heat exchange conduit means in said high pressure separator means for receiving a flow of heat exchange liquid therethrough for transferring heat from said heat exchange liquid to the contents of said separator means;

(c) heating means for providing a supply of hot, heat exchange liquid, said heating means having an optimum operating temperature range;

(d) gas operated burner means operatively associated with said heating means for heating said heat exchange liquid in said heating means;

(e) gas operated burner pilot means for igniting said burner means;

(f) circulation conduit means for providing circulation of said heat exchange liquid between said heating means and said heat exchange conduit means in said separator means;

(g) operating gas supply means for supplying well gas for heating and for operating various separator control systems;

(h) gas jet means in fluid communication with said operating gas supply means for injecting gas into said circulation conduit means for circulating said heat exchange liquid in said circulation conduit means;

(i) sealed gas recapture means for recapturing substantially all of said gas injected into said circulation conduit means by said gas jet means, said sealed gas recapture means being in continuous fluid communication with said burner pilot means and being in interruptible fluid communication with said burner means, all gas collected by said gas recapture means being subsequently transferred to said burner pilot means and said burner means;

(j) control valve means operatively associated with a main burner means for selectively controlling the gas flow to said main burner means from said gas recapture means;

(k) heating means thermostat means operatively associated with said control valve means for controlling the gas flow to said main burner means in response to the temperature in a selected portion of said heating means whereby said main burner means is selectively operated to maintain the temperature in said selected portion of said heating means within said optimum operating temperature range;

(l) whereby pressure energy from all gas injected into said circulation conduit means is used to increase the circulation rate of said heat exchange liquid in said circulation conduit means and whereby gas collected in said sealed gas recapture means is subsequently burned by said burner pilot means and said burner means.

DETAILED DESCRIPTION OF THE INVENTION

Figure 1:
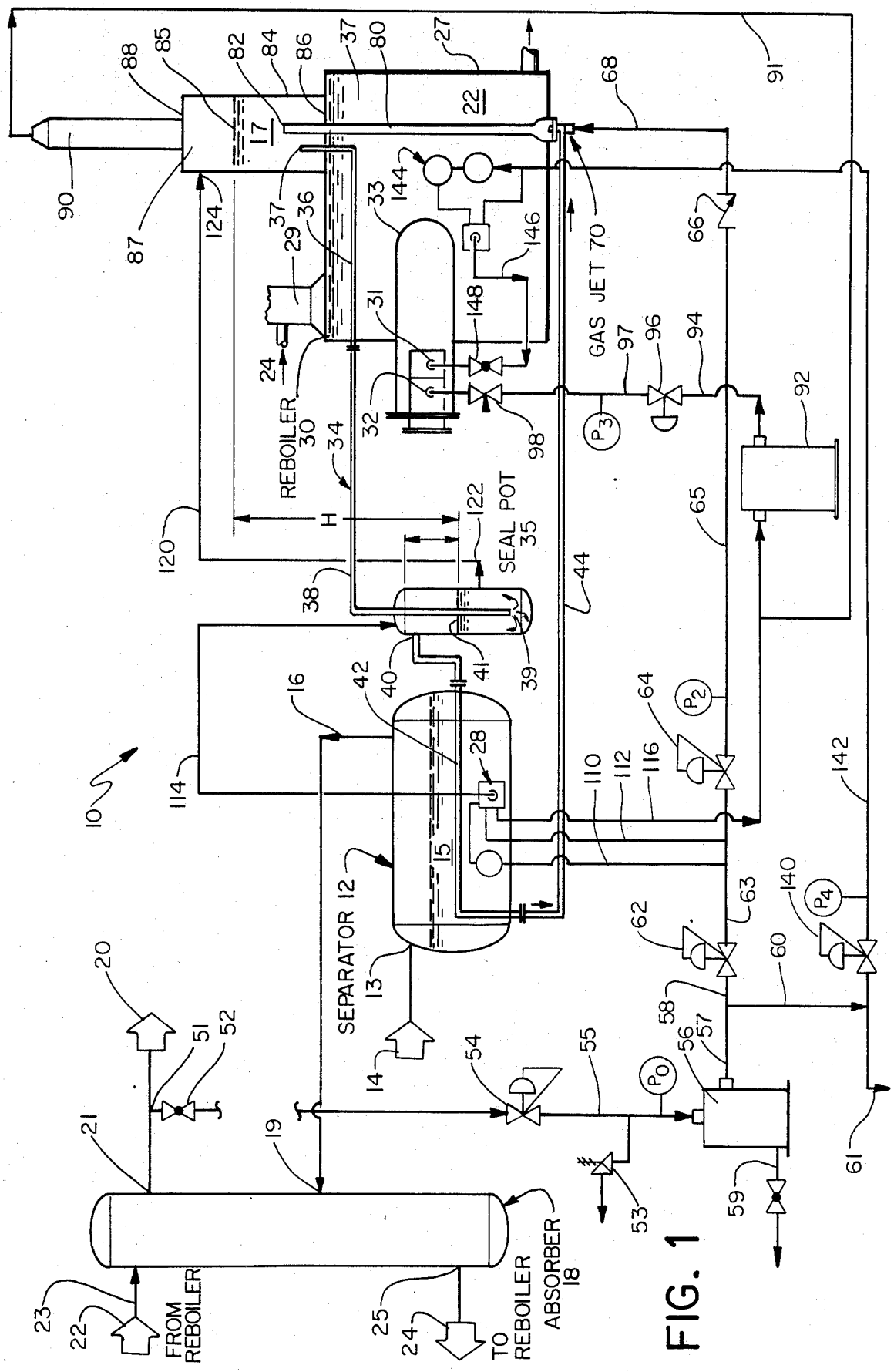
FIG. 1 is a schematic drawing showing basic operating components of a circulating glycol heating system for a high pressure separator of the type used at a gas well head.

The well affluent separator system 10 of the present invention is adapted for use at a gas well head for processing well affluent to obtain dry sale gas therefrom. The invention in general includes a high pressure separator 12 adapted to receive well gas 14 to separate and remove certain entrained liquids therefrom; a heating means such as a reboiler 30 which heats a supply of heating fluid such as heating glycol 17 in a riser portion 84 thereof; circulating loop 34 which circulates heating glycol between the reboiler 30 and separator 12 to provide heat to the separator; a drying assembly such as absorber 18 for drying well gas received from the separator 12 to produce dry sale gas 20; and a burner means 31, having a burner pilot 32, used in combination with a fire tube 33 to heat glycol in the heating means. The burner means is fueled by gas which is supplied from the sale gas line leaving the absorber 18. At least a portion of the gas which is ultimately burned by the burner means is first injected by a gas jet means 70 into the heating glycol circulation loop 34 thereby transferring mechanical energy to the heating glycol to cause it to circulate. All of the gas injected into the heating glycol as well as certain other control gas used to operate heating system controls is subsequently recaptured and burned in the burner means. In one embodiment, FIG. 1, the recaptured gas is burned only by the burner pilot 32. In another embodiment, FIG. 2, the recaptured gas is burned by both the main burner 31 and the burner pilot 32. A gas pressure operated seal pot 35 is used to selectively interrupt the circulation of heating glycol between the reboiler 30 and separator 12 to control the temperature of the separator 12. Having thus described the invention in general certain features of the invention will now be described in further detail.

High pressure separator 12 includes a well effluent inlet 13 whereat well gas 14 is received from the well head. The gas passes through a demister (not shown) which causes oils and other liquids to be separated from the well effluent. These liquids 15 from the well gas are collected in the lower portion of the separator and are heated by heating conduit 42 to maintain the temperature of the separator at a preset optimum value. The separator liquids 15 are periodically removed from the separator by conventional dump valve arrangements (not shown) as described in U.S. Pat. No. 4,342,572. Gas is discharged from the separator through outlet line 16 to various conventional drying assemblies, such as described in U.S. Pat. No. 4,342,572 and elsewhere, for further removing moisture from the gas. The drying assemblies are collectively represented herein as absorber unit 18. Gas containing substantial amounts of water vapor is received at an absorber inlet 19 and dry sale gas 20 is subsequently discharged from the absorber outlet 21. The absorber unit 18 utilizes process glycol to dry the well gas passing therethrough. Dry process glycol 22 from the reboiler 30 is received at the absorber glycol inlet 23 and wet process glycol 24, which carries away moisture from the well gas, is discharged to the reboiler 30 from the absorber at process glycol outlet 25. The wet process glycol from the absorber is partially dried in a still column 29 portion of the reboiler 30 and is thereafter stored in a process glycol tank 27 portion of the reboiler 30 where it is maintained at an elevated temperature by means of burner 31 and associated fire tube 33 as described in further detail hereinafter. The reboiler process glycol tank 27, and still column 29 form part of a closed loop glycol drying system (shown only partially herein) which is operated at atmospheric pressure. Such a closed loop glycol drying system is described in detail in U.S. Pat. No. 4,342,572 of Rodney Heath entitled THERMAL CIRCULATION GAS TREATER which is hereby incorporated by reference for all that it discloses.

Some of the sale gas 20 which is normally discharged to gas pipelines, etc. for subsequent sale, may be directed, as by control gas supply line 51, back to certain system operating components for subsequent use at the well head site as described further hereinafter.

The heating means which may be a reboiler 30 is heated by a burner means including a main gas burner 31 and associated burner pilot 32. The main burner and burner pilot are assembled in a conventional fire tube 33. The fire tube 33 extends into the reboiler tank 27 contacting a supply of process glycol contained therein which in turn transfers heat to heating glycol 17 contained in a closed loop glycol heating system which includes a heating glycol storage area provided by a sealed expansion riser 84 portion of the reboiler 30. Heating glycol 17 in expansion riser 84 is sealed off from process glycol in reboiler tank portion 27 as described in further detail below. The heating glycol contained by the expansion riser 84 circulates through circulation loop 34 which passes through a seal pot 35 and separator 12 and then returns to the expansion riser. Circulation loop 34 includes a reboiler conduit coil portion 36 which passes through an upper portion of the reboiler tank 27 above fire tube 33. The reboiler coil 36 terminates in the riser at an open end 37 into which glycol 17 from the riser 84 flows to begin circulation through the heating glycol circulation loop 34. Heating glycol in coil 36 is heated as it flows through coil 36 by the process glycol in tank 27. The reboiler coil 36 is connected to an upper circulation flow line 38 extending between the reboiler and a seal pot 35. Line 38 enters the seal pot in sealed relationship therewith and terminates at open end 39 at a lower portion of the seal pot. Seal pot 35 contains a variable volume of glycol having a liquid level 41. Liquid level 41 is selectively variable by application of control gas to the seal pot as described in further detail hereinafter. During normal circulating conditions the liquid level 41 is above the connection point 40 of a separator heating conduit (coil) 42 which passes through the separator. Under such normal circulation conditions glycol circulates through line 34 into seal pot 35 and out of seal pot 35 and through separator conduit 42, transferring heat to the separator. Separator heating conduit 42 is connected at a lower end thereof to circulation return flow line 44 which provides the return flow of heating glycol to the expansion riser 84 to complete circulation loop 34.

As mentioned above a gas supply line 51 in communication with the sale gas line from the absorber 18 provides gas used to operate certain system components. Gas entering line 51 is at a relatively high pressure, e.g. 500 psig, which varies from well to well. Line 51 may comprise a control valve 52 therein enabling the supply line to be isolated from the sale gas line. A pressure regulator 54 is provided in line 51 which reduces the pressure in downstream line portion 55 to a pressure $P_0$ which may be e.g. 75 psig. Line portion 55 communicates with a conventional drip pot 56 having a conventional relief valve 53 and drain line 59. Gas for burner and certain other system operations discharges from the drip pot 56 through line 57. Line 57 branches into two branch gas lines 58, 60. Branch line 58 leads to gas jet 70 with the gas passing therethrough being used to circulate heating glycol 17 and being ultimately burned by burner pilot 32. Gas entering branch line 60 may ultimately be burned by main burner 31 or may be used to operate other system components connected to line 61 which branches from line 60. Branch line 58 immediately downstream from the point where it branches is connected to a pressure regulator 62 which reduces the pressure in downstream line portion 63 to a pressure $P_1$ which may be e.g. 10 psig. Line portion 63 is in turn connected to a pressure regulator 64 which reduces the pressure in line portion 65 immediately downstream therefrom to a pressure $P_2$ which may be e.g. 8.5 psig. Line portion 65 is connected to a check valve 66 which is in turn connected to line portion 68 which terminates in gas jet 70 described in further detail hereinafter with reference to FIG. 3. Gas jet 70 injects gas from line 68 into an enlarged vertical pipe 80 which is also connected at the lower end thereof to heating glycol circulation conduit 44. Gas entering pipe 80 from gas jet 70 aerates and transfers mechanical energy to glycol within pipe 80 causing it to flow upwardly and ultimately causing glycol in line 44 and the remainder of the circulating loop 34 to flow in the same direction producing circulation within the circulating loop 34. Gas after leaving the gas jet bubbles out of the open end 82 of pipe 80 and is captured in cylindrical expansion riser portion 84. The expansion riser portion comprises a closed lower end 86 and a sealed upper end 88. A gas collection area 87 is provided between the sealed upper end 88 and the surface level 85 of the heating glycol 17 contained within the expansion riser. A gas scrubber 90 which removes entrained liquids from gas as it leaves gas collection area 87 is sealingly attached to riser upper portion 88 in fluid communication with gas in collection area 87. A gas line 91 from scrubber 90 is connected to pilot drip pot 92 which may comprise a conventional drip pot. The gas after passing through drip pot 92 is discharged through drip pot outlet line 94 to burner pilot 32 passing first through a pressure regulator 96 which reduces the pressure in line portion 97 immediately downstream thereof to a pressure $P_3$ compatible with pilot burner operation e.g. 4 psig. A needle valve 98 or the like may be positioned in line portion 97 to manually shut off gas flow to the pilot burner 32.

A pneumatic separator thermostat assembly 28 which supplies control gas to raise or lower the liquid level 41 within seal pot 35 receives pressure pilot gas through a pressure pilot line 110 connected to control gas line portion 63 and receives control gas through control line 112 also connected to line portion 63. The control gas from line 112 is selectively directed through line 114 to an upper portion of the seal pot at point 115 for lowering the fluid level therein. The thermostat assembly may be a conventional throttling type, pneumatic thermostat assembly such a produced by KIMRAY, Inc. of Oklahoma City, Okla., e.g. a model 3 PGRA pressure pilot connected to a model T12DA basin bonnet thermostat. The thermostat assembly is adapted to sense temperature within separator 12. When the separator temperature exceeds a preset optimum operating temperature, the thermostat assembly 28 applies gas at pressure $P_1$ to depress the liquid level in seal pot 35 to terminate the flow of heating glycol to heating conduit 42. In one preferred embodiment, the gas pressure from line 114 is sufficiently high so that, in addition to depressing the liquid level of glycol in seal pot 35, the gas pressure also forces the heating glycol out of line 42 to rapidly terminate the transfer of heat to the separator 12. However the system may also be operated without such removal of glycol from line 42. A thermostat pressure pilot vent line 116 is provided to allow back venting of gas from the seal pot through the thermostat assembly after gas flow from the pressure pilot portion of the thermostat assembly to the seal pot is terminated. This return gas may be vented to the drip pot 92 to ultimately be burned by the pilot burner. A seal pot relief line 120 is provided in the seal pot at a position 122 below the separator coil connection point 40. Relief line 120 communicates with gas collection area 87 at inlet 124 in the expansion riser and is thus ultimately burned by the burner pilot. Seal pot relief line 120 prevents the liquid level 41 within the seal pot from being depressed below the terminal end 35 of circulating conduit portion 38 and thus prevents gas from blowing back in a reverse direction through the circulation loop in the event gas pressure $P_1$ is inadvertently set too high. However, under normal circumstances the liquid level in seal pot 35 would not be depressed to the level of relief line connection point 122.

The second branch 60 of the line leaving drip pot 56 is connected to a pressure regulator 140 which reduces the gas pressure in the line to a pressure $P_4$ e.g. 12-18 psig which is compatible with main burner operation. Line portion 142 immediately downstream of pressure regulator 140 is connected to reboiler thermostat assembly 144 which controls flow of gas through line 146 to main burner 31 in response to the temperature of heating glycol within the reboiler in a conventional manner well known in the art. A manual control valve 148 may be provided in the gas line immediately upstream of the burner.

Figure 3:
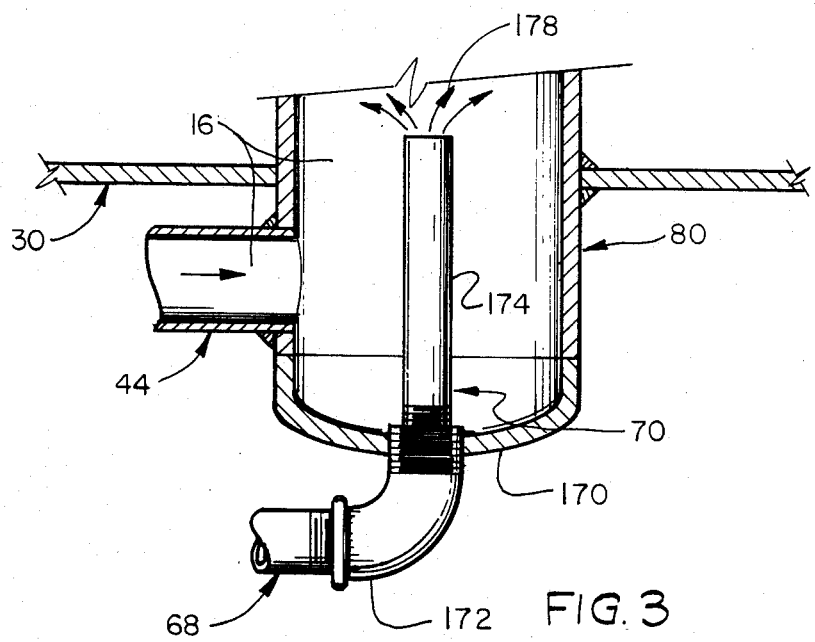
FIG. 3 is a detailed cross sectional elevation view of a gas jet and a portion of the heating glycol circulation conduit of FIG. 1.

A more detailed illustration of the gas jet 70 is provided by FIG. 3 wherein it is shown that vertical pipe 80 terminates in a sealed lower end 170 which is tapped to receive a conventional threaded elbow 172 in sealed relationship therewith. Elbow 172 is connected to gas line portion 68 at the lower end thereof and in turn has a small diameter, e.g. ¼ inch, pipe 174 threadingly attached to an upper portion thereof. The pipe 174 may be on the order of four to six inches in length, terminating at an open end 178 out of which gas 179 is injected into the heating glycol in surrounding pipe 80. Glycol flows into pipe 80 through line 44 which enters a lower sidewall portion of pipe 80 immediately below the reboiler 30.

In operation gas is continuously supplied to the burner pilot at a flow rate equal to the pilot's required gas consumption rate. The pilot is in continuous fluid communication with supply line 51 through drip pot 56, lines 57, 58, 63, 65, 68, gas jet 70, collection area 87, scrubber 90, line 91, drip pot 92 and lines 94 and 97. Gas from the gas jet, through a jetting effect within pipe 80, transfers energy to the glycol in the area immediately surrounding the jet urging the glycol in the pipe 80 in an upward direction which thereby causes glycol to circulate through the entire circulating loop 34 under normal conditions i.e. when seal pot level 41 is above separator heating conduit connection point 40. Gas from the jet at a pressure equal to pressure $P_2$ in line 65, less the hydrostatic fluid head, is collected in gas collection area 87. This gas is in turn continuously supplied through the scrubber 90 and drip pot 92 to the burner pilot where it is continuously burned. Thus all of the gas used to circulate the heating glycol within loop 34 is ultimately burned by the burner pilot 32. The main burner 148 which is supplied through line 60 is operated intermittently depending upon the temperature of heating glycol within the reboiler. The reboiler thermostat 144 is set to operate within an optimum temperature range, thus when the temperature in the reboiler falls below the optimum range, thermostat assembly 144 causes gas to flow through line 146 to the burner. When the temperature in the reboiler rises above the optimum range thermostat assembly 144 terminates the flow of gas through line 146 to the burner. Thus it will be seen that circulation energy is provided to glycol in circulation loop 34 continuously and independently of the operation of the main burner. Separator thermostat assembly 28 is designed to maintain the temperature of the separator within a predetermined optimum temperature range. When the temperature in the separator exceeds the optimum temperature range thermostat assembly 28 provides pressurized gas at pressure $P_1$ through line 114 to an upper portion of the seal pot 35. The pressure $P_1$ must be sufficiently great to overcome the combined pressure $P_2$ and the pressure head provided by the elevation difference between the glycol level 85 in riser 84 and the glycol level 41 in the seal pot 35. Typical pressures of $P_1$ and $P_2$ may be for example 10 psig and 8.5 psig, respectively. After the separator temperature is reduced below the optimum operating range the thermostat assembly 28 terminates the flow of gas through line 114 and back vents gas in seal port 35 through line 116 to drip pot 92 from which it is subsequently discharges to and burned by the burner pilot 32. Thus it will be seen that, in addition to the gas provided by the gas jet 70, control gas used to control the fluid level in the seal pot 35 is also collected and burned by the burner pilot.

Figure 2:
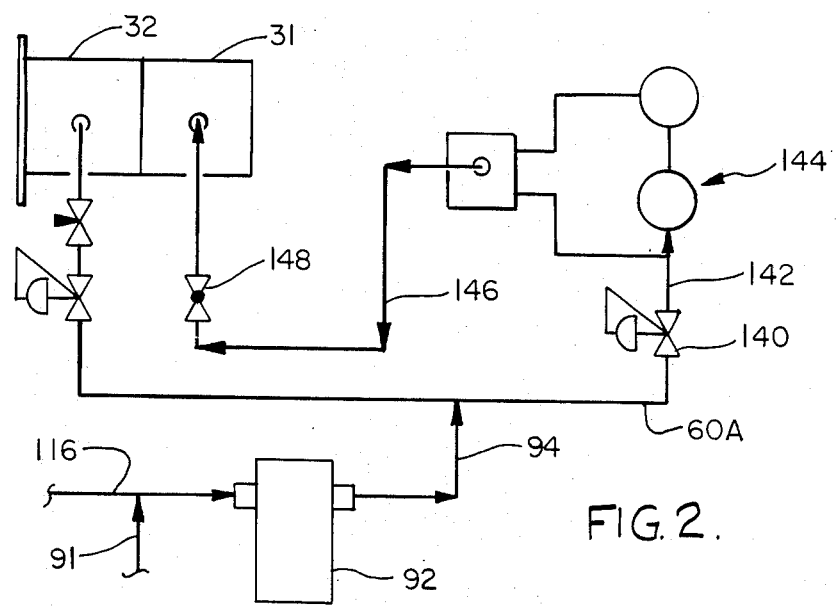
FIG. 2 is a schematic drawing showing a modification of the burner gas supply shown in FIG. 1.

In a slightly different embodiment of the invention illustrated in FIG. 2 the position of branch line 60 is changed as indicated as 60A in FIG. 2 and gas to the main burner 31 as well as the burner pilot 32 is caused to flow through jet 70. In this embodiment branch line 60, rather than branching from line 57, brances from line 94 immediately downstream of drip pot 92 with the remainder of the system being identical to the system illustrated in Fig. 1. In this arrangement when burner supply line 146 is opened by thermostat 144 a relatively large amount of gas is demanded which passes through line 58, etc. through gas jet 70, etc. thereto. As a result a substantially increased amount of gas is jetted through gas jet 70 with a corresponding increase in the circulation rate of the system whenever the main burner 31 is fired. During periods when the main burner is not firing gas is still continuously jetted through the gas jet 70 in accordance with the demands of the pilot burner 32. Thus in either embodiment a continuous circulation of heating glycol between the separator and reboiler is provided except in situations when this circulation flow is terminated by depression of the liquid level in seal pot 35.

Thus flow energy of natural gas from the well head is always available to circulate heating glycol and all of the gas used to produce this circulation is ultimately consumed by the reboiler burner means. As a result a rapid response separator heating system is provided which uses no more natural gas to operate than a slower responding thermosyphon type system.

It is contemplated that the inventive concepts herein described may be variously otherwise embodied and it is intended that the appended claims be construed to include alternative embodiments of the invention except insofar as limited by the prior art.

What is claimed is:

1. A method of heating a natural gas separator used at a natural gas well head comprising:
   (a) heating a supply of heat exchange liquid in a heating unit having a gas burner and a gas operated burner pilot;
   (b) providing a closed loop circulation line containing heat exchange liquid in heat exchanging relationship with the heating unit and in heat exchanging relationship with the separator;
   (c) continuously, at a rate dependent upon the pilot burner gas consumption rate, injecting gas recovered from the well head through a jet nozzle into the heat exchange liquid in the closed loop circulation line so as to continuously circulate the heat exchange liquid in the circulation line;
   (d) separating the gas injected into the circulation line from the heat exchange liquid;
   (e) collecting the separated gas in a sealed collection area;
   (f) continuously using the gas collected in the collection area to fuel the burner pilot.

2. The invention of claim 1 comprising the step of:
   continuously controlling the rate at which gas is injected into the heat exchange liquid from the jet nozzle based upon the immediate gas consumption requirements of the burner pilot.

3. The invention of claim 1 comprising the further steps of:
   (a) continuously monitoring the temperature of the separator contents;
   (b) providing a flow of heat exchange liquid through a portion of the circulation line passing through the separator when the separator temperature is below a preselected temperature value;
   (c) interrupting the flow of heating liquid through the portion of the circulation line passing through the separator when the temperature in the separator is above a preselected temperature so as to maintain the temperature of the selector within a preselected range.

4. The invention of claim 3 comprising the further step of:
   using control gas to provide pressure to a seal pot for controlling the flow of heating liquid through the separator.

5. The invention of claim 4 comprising the further step of:
   discharging the gas used for controlling the flow of heating liquid through the separator into the gas recapture area.

6. The invention of claim 4 comprising the further step of:
   using control gas to provide pressure to evacuate heating liquid from the portion of the circulation line passing through the separator when the temperature in the separator is above said preselected temperature so as to rapidly terminate heat exchange between the separator contents and the heating liquid.

7. A method of heating a natural gas separator used at a natural gas well head comprising:
   (a) heating a supply of heat exchange liquid in a heating unit having a gas burner and a gas operated burner pilot;
   (b) providing a closed loop circulation line containing heat exchange liquid in heat exchanging relationship with the heating unit and in heat exchanging relationship with the separator;
   (c) continuously, at a rate dependent on the consumption requirements of the burner and burner pilot, injecting gas recovered from the well head through a jet nozzle into the heat exchange liquid in the closed loop circulation line so as to continuously circulate the heat exchange liquid in the circulation line;
   (d) separating the gas injected into the circulation line from the heat exchange liquid;
   (e) collecting the separated gas in a sealed collection area;
   (f) continuously using the gas collected in the collection area to fuel the burner pilot;
   (g) interruptibly using the gas collected in the collection area to fuel the gas burner.

8. The invention of claim 7 comprising the further step of:
   continuously controlling the rate at which gas is injected into the heat exchange liquid from the jet nozzle based upon the immediate gas consumption requirements of the burner pilot and gas burner.

9. The invention of claim 7 comprising the further step of:
   controlling the flow of gas to the gas burner based upon the temperature of liquid in the heating unit.

10. The invention of claim 7 comprising the further steps of:
    (a) continuously monitoring the temperature of the separator contents;
    (b) providing a flow of heat exchange liquid through a portion of the circulation line passing through the separator when the separator temperature is below a preselected temperature value;
    (c) interrupting the flow of heat exchange liquid through the portion of the circulation line passing through the separator when the temperature in the separator is above a preselected temperature so as to maintain the temperature of the separator within a preselected range.

11. The invention of claim 10 comprising the further step of:
    using control gas to provide pressure to a seal pot for controlling the flow of heat exchange liquid through the separator.

12. The invention of claim 11 comprising the further step of:
    discharging the gas used for controlling the flow of heat exchange liquid through the separator into the gas recapture area.

13. The invention of claim 11 comprising the further step of:
    using control gas to provide pressure to evacuate heat exchange liquid from the portion of the circulation line passing through the separator when the temperature in the separator is above said preselected temperature so as to rapidly terminate heat exchange between the separator contents and the heat exchange liquid.

14. A well effluent separator system for use at a well head for processing well effluent to obtain a relatively liquid free gas comprising:
    (a) high pressure separator means having an optimum operating temperature range for receiving well effluent and for separating said well effluent into a liquid component and a relatively liquid free gas component;
    (b) heat exchange conduit means in said high pressure separator means for receiving a flow of heat exchange liquid therethrough for transferring heat from said heat exchange liquid to the contents of said separator means;
    (c) heating means for providing a supply of hot, heat exchange liquid, said heating means having an optimum operating temperature range;
    (d) gas operated burner means operatively associated with said heating means for heating said heat exchange liquid therein;
    (e) gas operated burner pilot means for igniting said burner means;
    (f) circulation conduit means for enabling circulation of said heat exchange liquid between said heating means and said heat exchange conduit means in said separator means;
    (g) operating gas supply line means for supplying well gas for said gas operated burner means;
    (h) gas jet means in continuous fluid communication with said operating gas supply line means for continuously injecting gas into said circulation conduit means for producing circulation of said heat exchange liquid in said circulation conduit means;
    (i) sealed gas recapture means having a sealed gas chamber in fluid communication with said heat exchange liquid for recapturing substantially all of said gas injected into said circulation conduit means by said gas jet means, said sealed gas recapture means being in continuous fluid communication with said burner pilot means whereby gas collected by said gas recapture means is subsequently burned by said burner pilot means.

15. The invention of claim 14 wherein the amount of gas injected by said gas jet means is proportionate to the pilot burner gas consumption amount.

16. The invention of claim 14 wherein:
    said sealed gas recapture means comprises a gas chamber in fluid communication with said hot heat exchange liquid in said heating means.

17. The invention of claim 16 wherein said sealed gas recapture means further comprises:
a gas drier in fluid communication with said gas chamber; and
a drip pot in fluid communication with said gas chamber.

18. The invention of claim 14:
said circulation conduit means comprising seal pot means for selectively controlling the flow of heat exchange liquid to said heat exchange conduit means in said high pressure separator means;
said seal pot means comprising a selectively variable liquid level of heat exchange liquid therein for controlling the flow of said heat exchange liquid to said heat exchange conduit means in said high pressure separator means whereby the temperature in said high pressure separator means is selectively variable through control of said variable liquid level in said seal pot means.

19. The invention of claim 18 further comprising:
separator thermostat means operatively associated with said separator means for sensing the temperature therein and for providing a control signal responsive thereto for selectively varying said liquid level in said seal pot means.

20. The invention of claim 19 wherein:
said separator thermostat means comprises a gas pressure operative thermostat means having a control gas inlet and a control gas outlet, said inlet being in fluid communication with a selected portion of said operating gas supply line means and said control gas outlet being in fluid communication with said seal pot means;
said separator thermostat means selectively varying the fluid level in said seal pot means with pressurized gas from said selected portion of said operating gas supply line means in response to the temperature in said separator means whereby the temperature in said separator means is maintained within said optimum operating temperature range.

21. The invention of claim 20 wherein:
said gas pressure in said selected portion of said operating gas supply line means is greater than the sum of the gas pressure in said sealed gas recapture means and the elevation head due to a difference in elevation between a heat exchange liquid level in said gas recapture means and a heat exchange liquid level in said seal pot means, whereby sufficient gas pressure is provided through said separator thermostat means to said seal pot means to vary the fluid level therein.

22. The invention of claim 21, said seal pot means comprising control gas discharge means operatively connected to said gas recapture means for depressurizing said seal pot means for enabling elevation of the liquid level therein.

23. The invention of claim 22 wherein control gas discharged through said control gas discharge means is discharged into said sealed gas recapture means.

24. A well effluent separator system for use at a well head for processing well effluent to obtain a relatively liquid free gas comprising:
(a) high pressure separator means having an optimum operating temperature range for receiving well effluent and for separating said well effluent into a liquid component and a wet gas component;
(b) heat exchange conduit means in said high pressure separator means for receiving a flow of heat exchange liquid therethrough for transferring heat from said heat exchange liquid to the contents of said separator means;
(c) heating means for providing a supply of hot, heat exchange liquid, said heating means having an optimum operating temperature range;
(d) gas operated burner means operatively associated with said heating means for heating said heat exchange liquid in said heating means;
(e) gas operated burner pilot means for igniting said burner means;
(f) circulation conduit means for providing circulation of said heat exchange liquid between said heating means and said heat exchange conduit means in said separator means;
(g) operating gas supply means for supplying well gas for said burner means and said burner pilot means;
(h) gas jet means in fluid communication with said operating gas supply means for injecting gas into said circulation conduit means for circulating said heat exchange liquid in said circulation conduit means;
(i) sealed gas recapture means for recapturing substantially all of said gas injected into said circulation conduit means by said gas jet means, said sealed gas recapture means being in continuous fluid communication with said burner pilot means and being in interruptible fluid communication with said burner means, all gas collected by said gas recapture means being subsequently transferred to said burner pilot means and said burner means;
(j) control valve means operatively associated with a main burner means for selectively controlling the gas flow to said main burner means from said gas recapture means;
(k) heating means thermostat means operatively associated with said control valve means for controlling the gas flow to said main burner means in response to the temperature in a selected portion of said heating means whereby said main burner means is selectively operated to maintain the temperature in said selected portion of said heating means within said optimum operating temperature range;
(l) whereby pressure energy from all gas injected into said circulation conduit means is used to increase the circulation rate of said heat exchange liquid in said circulation conduit means and whereby gas collected in said sealed gas recapture means is subsequently burned by said burner pilot means and said burner means.

25. The invention of claim 24 wherein:
said sealed gas recapture means comprises a gas chamber in fluid communication with said hot heat exchange liquid in said heating means.

26. The invention of claim 25 wherein said sealed gas recapture means further comprises:
a gas drier in fluid communication with said gas chamber; and
a drip pot in fluid communication with said gas chamber.

27. The invention of claim 24:
said circulation conduit means comprising seal pot means adapted to receive heat exchange liquid therein for selectively controlling the flow of heat exchange liquid to said heat exchange conduit means in said high pressure separator means;

said seal pot means comprising pressurization means for selectively varying the liquid level of heat exchange liquid therein for controlling the flow of said heat exchange liquid to said heat exchange conduit means in said high pressure separator means whereby the temperature in said high pressure separator means is selectively variable through control of said variable liquid level in said seal pot means.

28. The invention of claim 24 further comprising:

separator thermostat means operatively associated with said separator means for sensing the temperature therein and for providing a control signal responsive thereto for selectively varying said liquid level in said seal pot means.

29. The invention of claim 28 wherein:

said separator thermostat means comprises a gas pressure operative thermostat means having a control gas inlet and a control gas outlet, said inlet being in fluid communication with a selected portion of said operating gas supply line means and said control gas outlet being in fluid communication with said seal pot means;

said separator thermostat means selectively varying the fluid level in said seal pot means with pressurized gas from said selected portion of said operating gas supply line means in response to the temperature in said separator means whereby the temperature in said separator means is maintained within said optimum operating temperature range.

30. The invention of claim 29 wherein:

said gas pressure in said selected portion of said operating gas supply line means is greater than the sum of the gas pressure in said sealed gas recapture means and the elevation head due to a difference in elevation between a heat exchange liquid level in said gas recapture means and a heat exchange liquid level in said seal pot means, whereby sufficient gas pressure is provided through said separator thermostat means to said seal pot means to vary the fluid level therein.

31. The invention of claim 30, said seal pot means comprising control gas discharge means operatively connected to said gas recapture means for depressurizing said seal pot means for enabling reduction of the liquid level therein.

32. The invention of claim 31 wherein control gas discharged through said control gas discharge means is discharged into said sealed gas recapture means.

* * * * *